(12) United States Patent
Walker

(10) Patent No.: US 7,174,080 B2
(45) Date of Patent: Feb. 6, 2007

(54) GUIDED WAVE SPATIAL FILTER

(75) Inventor: Robert Graham Walker, Northampton (GB)

(73) Assignee: Bookham Technology, plc, Towcester (GB)

( * ) Notice: Subject to any disclaimer, the term of this patent is extended or adjusted under 35 U.S.C. 154(b) by 78 days.

(21) Appl. No.: 10/398,830

(22) PCT Filed: Oct. 8, 2001

(86) PCT No.: PCT/GB01/04479

§ 371 (c)(1),
(2), (4) Date: Sep. 11, 2003

(87) PCT Pub. No.: WO02/31587

PCT Pub. Date: Apr. 18, 2002

(65) Prior Publication Data

US 2004/0131310 A1    Jul. 8, 2004

(30) Foreign Application Priority Data

Oct. 9, 2000 (GB) ............................... 0024670.2

(51) Int. Cl.
G02B 6/10 (2006.01)
G02B 6/26 (2006.01)

(52) U.S. Cl. .................. 385/131; 385/132; 385/29

(58) Field of Classification Search ........ 385/129–132, 385/27, 29, 39
See application file for complete search history.

(56) References Cited

U.S. PATENT DOCUMENTS

| | | | |
|---|---|---|---|
| 4,776,655 A | * | 10/1988 | Robertson et al. .......... 385/130 |
| 4,999,686 A | * | 3/1991 | Autier et al. ................. 385/14 |
| 5,093,884 A | | 3/1992 | Gidon et al. ................. 385/132 |
| 5,109,464 A | * | 4/1992 | Munowitz et al. .......... 385/130 |
| 5,333,000 A | * | 7/1994 | Hietala et al. ............... 342/368 |
| 5,745,614 A | | 4/1998 | Kersten et al. ............... 385/29 |
| 5,748,811 A | * | 5/1998 | Amersfoort et al. .......... 385/15 |
| 6,111,998 A | * | 8/2000 | Ido et al. ...................... 385/29 |
| 6,621,972 B2 | * | 9/2003 | Kimerling et al. .......... 385/132 |

FOREIGN PATENT DOCUMENTS

| | | |
|---|---|---|
| EP | 0 363 076 B1 | 1/1996 |
| JP | 09 005 549 | 1/1997 |
| JP | 10 073 791 | 3/1998 |
| JP | 2000-98148 A | 4/2000 |

* cited by examiner

Primary Examiner—Sung Pak
Assistant Examiner—Eric Wong
(74) Attorney, Agent, or Firm—Lahive & Cockfield LLP; Anthony A. Laurentano, Esq.

(57) ABSTRACT

The invention concerns a guided wave spatial filter (300) for receiving input radiation and outputting corresponding filtered output radiation, the filter comprising first and second waveguide sections (30, L3, L5) connected in series, the sections: (a) mutually matched for transmitting fundamental mode radiation components present in the input radiation therethrough to provide the output radiation; and (b) mutually mismatched for hindering higher-order mode radiation components present in the input radiation from propagating therethrough and contributing to the output radiation. The spatial filter (300) is implemented using rib waveguides (30) for the sections with associated relatively deeply and relatively shallowly etched structures (20, 310, 320) for imparting to the sections their radiation mode filtration characteristics. The spatial filter according to the invention can be incorporated into optical splitters and optical modulators to enhance their performance and desensitise them to higher-order mode radiation injected thereinto.

16 Claims, 7 Drawing Sheets

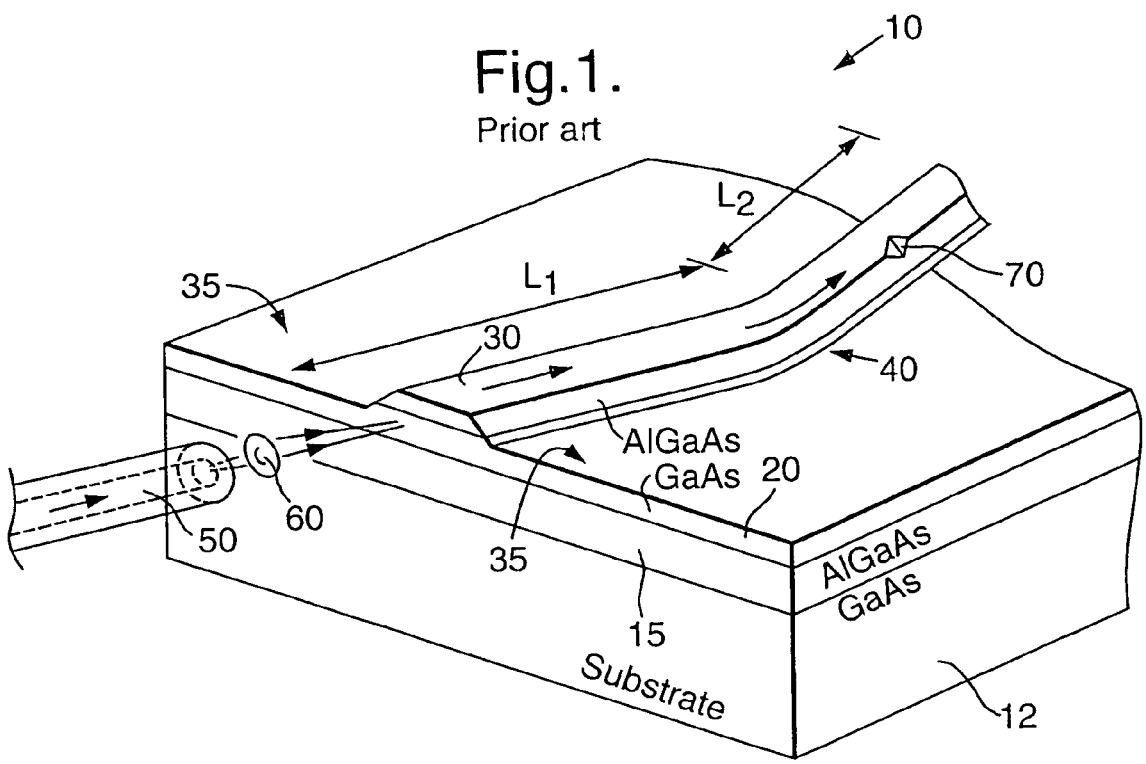
Fig.1.
Prior art
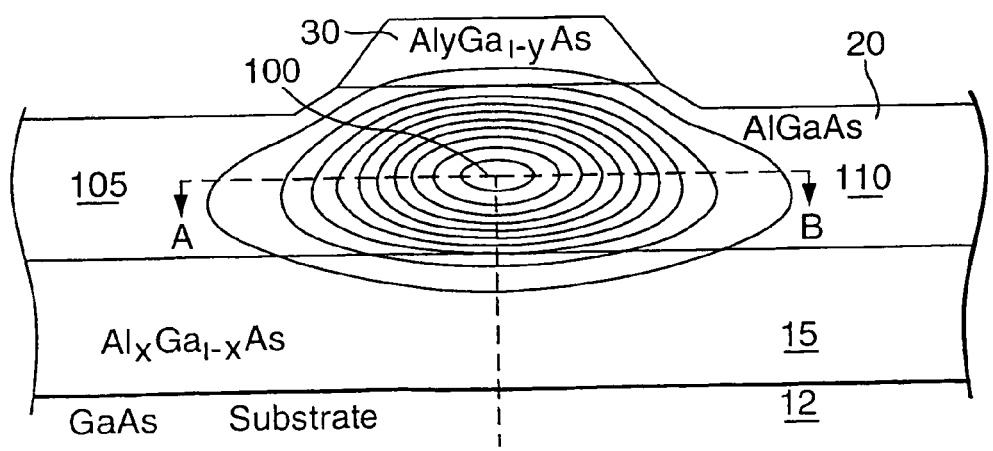
Fig.2.
Prior art
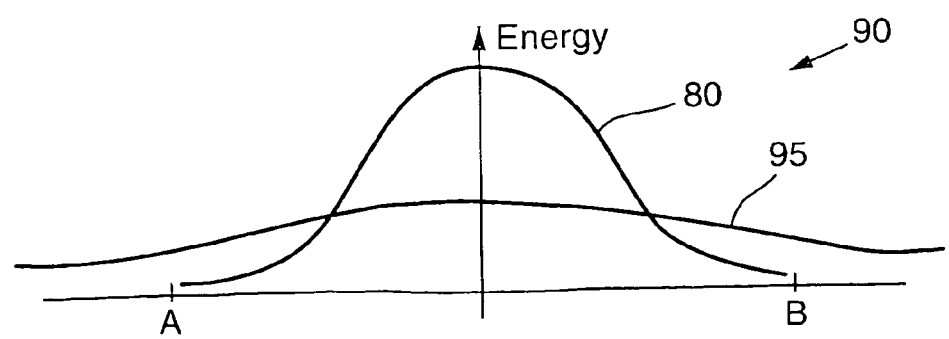

GUIDED WAVE SPATIAL FILTER

RELATED APPLICATIONS

This application is a 35 U.S.C. 371 national stage filing of International Application No. PCT/GB01/04479, filed 8 Oct. 2001, which claims priority to Great Britain Patent Application No. 0024670.2, filed on 9 Oct. 2000 in Great Britain. The contents of the aforementioned applications are hereby incorporated by reference.

BACKGROUND OF THE INVENTION

The present invention relates to a guided wave spatial filter, in particular but not exclusively to a guided wave spatial filter suitable for use in conjunction with rib waveguides in optical integrated circuits.

For the purposes of describing the present invention, optical radiation is defined as radiation having a free-space wavelength in a range of 100 nm to 15 µm.

Monolithic optical integrated circuits are well known. They are described in a publication "Introduction to Semiconductor Integrated Optics" by H P Zappe (ISBN 0-89006-789-9, Artech House Publishers 1995). A conventional optical integrated circuit includes a substrate onto which one or more optical waveguides are fabricated, the waveguides operable to guide optical radiation around the circuit. It is found especially convenient in such a circuit to employ surface rib waveguides, the rib waveguides being susceptible to fabrication using planar fabrication processes such as lithography and chemical etching.

A rib waveguide assumes the form of a ridge projecting from a major surface of the substrate, the ridge having associated therewith one or more refractive index interface regions to assist optical radiation confinement in the ridge. The optical radiation is guided along the ridge and is confined primarily to a region lying between the one or more interface regions and an upper surface of the ridge remotest from the substrate. In such a rib waveguide, a plurality of interface regions gives more degrees of freedom when optimising optical characteristics of the waveguide.

The ridge is designed to be of a width and height comparable to within an order of magnitude with the wavelength of optical radiation to be guided along the rib waveguide formed by the ridge. For example, a rib waveguide designed to guide optical radiation having a free-space wavelength of substantially 1.5 µm will have a lateral width in the order of 3 µm and a projection height of its ridge above its substrate in the order of 1 µm. The rib waveguide can be fabricated from silicon or alternatively from III–V compounds, for example aluminium gallium arsenide (AlGaAs) and gallium arsenide (GaAs). III–V compounds such as AlGaAs possess a crystal structure lacking a centre of symmetry and therefore exhibit both Pockets and Kerr effects. As a consequence of such asymmetry, rib waveguides based on III–V compounds are especially suitable for use in fabricating active optical integrated circuits, for example optical modulators and switches.

SUMMARY OF THE INVENTION

For purposes of describing the present invention, it is important to distinguish between different modes of radiation which are capable of propagating within an optical integrated circuit including one or more rib waveguides, the different modes including:

(a) "in-plane radiation" modes which propagate in a plane parallel to a surface plane of the circuit from which the one or more rib waveguides project;
(b) "free radiation" modes corresponding to radiation which is scattered into a bulk region of a substrate forming the circuit and also into an air region neighbouring onto the rib waveguide and the surface plane;
(c) "bound-radiation" modes including two-dimensional modes and all higher-order modes capable of propagating along the waveguides; and
(d) "fundamental radiation" mode for which the waveguides are specifically designed to convey.

A higher-order mode is described by referring to its associated "m" number which is numerically equal to the number of zero-crossings in the transverse field profile of the higher-order mode radiation; high-order modes have an m value of one or more.

Rib waveguides are effective at guiding aforesaid fundamental mode optical radiation; in the fundamental mode, most of the optical radiation propagates in a region closely associated with the rib waveguide. However, such waveguides are also capable of guiding aforesaid bound-mode radiation. In theory, when fundamental mode optical radiation is launched into a rib waveguide capable of supporting multimode radiation propagation therethrough, the radiation propagates through the waveguide as fundamental mode radiation and coupling of energy from the fundamental mode to other radiation modes does not occur. In practice in real optical integrated circuits comprising rib waveguides, coupling between fundamental mode radiation and other radiation modes does occur. Such coupling arises at any abrupt discontinuity and especially where:

(a) the rib waveguide changes directions at bends therein, for example where it follows a curved path;
(b) the rib waveguide connects to an optical coupler, for example a multimode interference coupler (MMI); or
(c) the rib waveguide comprises geometrical disturbances which function as scattering defects.

Thus, in an optical integrated circuit including rib waveguides, fundamental mode radiation propagating therein can couple to higher-order bound radiation which propagates substantially together with its associated fundamental mode radiation. Indeed, the fundamental mode radiation and the higher-order mode radiation may interact coherently. Such coherent interaction often results in a quasi-chaotic perturbation to characteristics of the circuit because the fundamental mode radiation and the higher-order mode radiation possess different characteristic propagation velocities and therefore different relative phases at a downstream interaction zone within the integrated circuit. Where such an interaction zone corresponds to an interferometric modulator, for example a Mach-Zehnder interferometer, an extinction ratio characteristic of the modulator is degraded.

The aforesaid higher-order mode radiation propagates along paths coinciding fully with the fundamental mode radiation; the higher-order modes are distinguished from the fundamental mode by having a spatial energy profile which is somewhat broader and including a phase-reversing lobe structure corresponding to m values of unity or greater. Coupling of radiation from the fundamental mode can also give rise to aforesaid in-plane radiation and free radiation modes.

In an integrated optical circuit including rib waveguides in which fundamental mode radiation is coupled to higher-order mode radiation, attenuating the higher-order mode radiation by using, for example, tapered rib waveguide filter structures adapted to promote the transmission of substantially fundamental mode radiation therethrough is not found to be effective. Such a tapered structure simply results in the coupling of the aforementioned higher-order mode radiation to loosely bound radiation modes which nevertheless follow the path of the waveguides. The loosely bound radiation modes can persist for relatively long distances, for example in the order of mm, spreading and dissipating only gradually with propagation distance.

The inventor has appreciated that the free radiation modes, the in-plane radiation modes and the bound modes are deleterious to the optical performance of optical integrated circuits including rib waveguides. Moreover, the inventor has devised a solution to address this problem, the solution being in the form of a spatial filter which is effective at attenuating loosely bound radiation modes and higher-order bound radiation modes, and transmitting fundamental mode radiation.

Thus, according to a first aspect of the present invention, there is provided a guided wave spatial filter for receiving input radiation and outputting corresponding filtered output radiation, the filter comprising first and second waveguide sections connected in series, the sections:

(a) mutually matched for transmitting fundamental mode radiation components present in the input radiation therethrough to provide the output radiation; and (b) mutually mismatched for hindering higher-order mode radiation components present in the input radiation from propagating therethrough and contributing to the output radiation.

The invention provides the advantage that it is capable of attenuating higher-order bound mode radiation components and preferentially transmitting fundamental mode radiation.

Fundamental mode radiation is defined as radiation having a corresponding modal m value of zero. Higher-order bound mode radiation is defined as radiation having a corresponding modal m value of unity or greater.

The spatial filter is beneficially fabricated using microfabrication techniques such that the waveguide sections comprise rib waveguides. Rib waveguides are convenient to use when designing integrated optical circuits, thereby enabling the filter of the invention to be incorporated into such circuits.

When implementing the spatial filter, it is convenient that the first section is flanked by first regions for supporting fundamental mode propagation along the first section and the second section is flanked by second regions for stripping in-plane radiation modes, the first regions being more shallowly etched relative to the second regions. Such etching can be used to impart desired optical characteristics to the sections.

Beneficially, the second regions do not encroach onto the second section but are spatially separated therefrom by the first regions. Preferably, the second regions are tapered towards the second section to provide a pin-hole type filter.

When fabricating the aforementioned first and second waveguide sections using rib waveguides, it is important that dimensional tolerances are precisely controlled. In order to achieve such precise dimensional control, the inventor has devised a self-aligning process for fabricating the sections. Conveniently, where a self aligned process can be used, the second regions extend to abut onto the second section.

In order to provide adequate radiation containment in the second section, the second section preferably includes outwardly inclined walls to its rib waveguide, the walls mutually inclined to hinder lateral mode radiation propagation along the second section.

In the spatial filter, it is desirable to deflect in-plane mode radiation away from propagation paths of corresponding fundamental mode radiation. Thus, preferably, the second regions have boundary edges which are disposed at non-orthogonal angles relative to an elongate axis of the second section, the edges operable to deflect higher-order mode radiation received thereat away from a fundamental mode radiation propagation path along the second section.

For obtaining satisfactory filtration, the rib waveguide of the second section is preferably laterally broader than the rib waveguide of the first section. However, when designing the spatial filter, rib waveguide widths in the sections are selected to provide a satisfactory matching of fundamental mode radiation between the sections.

The spatial filter is preferably arranged so that the second section is provided with two first sections configured to precede and follow the second section, the sections being connected in series. Such an arrangement is advantageous where the first sections correspond to a form of rib waveguide generally used in an optical integrated circuit incorporating the filter as an in-line component where the filter employs a form of rib waveguide not generally used in the integrated circuit for the second section.

According to a second aspect of the present invention, there is provided an optical radiation splitter comprising a mixing region for supporting multimode radiation propagation therein, an input waveguide for injecting radiation into the mixing region, a plurality of output waveguides for receiving radiation output from the mixing region, and a spatial filter according to the first aspect of the present invention included between the input waveguide and the mixing region for transmitting fundamental mode radiation from the input waveguide into the mixing region and for hindering higher-order mode radiation from being injected from the input waveguide into the mixing region.

The filter provides the benefit that higher-order mode radiation injected into the input waveguide, for example resulting from a misaligned fibre waveguide connected to the input waveguide, does not interfere with operation of the splitter, the splitter thereby being desensitised to higher-order mode radiation components input to the splitter.

In the splitter, it is beneficial that at least one of the output waveguides is connected to the mixing region through a spatial filter according to the first aspect of the invention, the filter operable to hinder coupling of higher-order mode radiation from the mixing region into said at least one of the output waveguides. Inclusion of the filter at the output waveguides assists to prevent higher-order mode radiation excited within the mixing region being coupled downstream to other optical devices connected to the splitter.

In a third aspect of the present invention, there is provided an optical modulator incorporating modulating means for selectively diverting radiation input to the means between a plurality of output paths in response to a control signal applied to the means, at least one of the output paths including a filter according to the first aspect of the present invention for transmitting fundamental mode radiation output from the means to said at least one of the output paths and for hindering propagation of higher-order mode radiation from the means to said at least one of the output paths.

It is preferable that the modulating means and output paths are implemented in rib-waveguide form, the modulating means and the filter being flanked by regions which are sufficiently deeply etched to render them unsusceptible to propagating higher-order mode radiation therethrough. The relatively deeply etched regions are effective at containing radiation and thereby providing the modulator with an enhanced extinction ratio.

When designing the modulator to be compact, it is beneficial that at least one of the output paths includes a faceted rib waveguide boundary where the path adjoins onto the modulating means, inclusion of the boundary enabling the path to project directly away from the modulating means at a greater angle than possible without the faceted boundary. Such a greater angle enables the modulator in microfabricated form to be shorter.

In order to desensitise the modulator to higher-order mode radiation injected thereinto, the modulator preferably comprises an input path for injecting radiation into the modulating means, the input path connected through a filter according to the first aspect of the invention, the filter operable to transmit fundamental mode radiation from the input path to the modulating means and to hinder higher-order mode radiation being injected from the input path to the modulating means.

Preferably, the modulating means comprises a structure susceptible to electric field induced changes of refractive index for selectively diverting the radiation input to the modulating means to the output paths.

In a fourth aspect of the present invention, there is provided a method of fabricating a guided wave spatial filter for receiving input radiation and outputting corresponding spatially filtered output radiation, the filter comprising first and second rib-waveguide sections connected in series, the sections mutually matched for transmitting fundamental mode radiation components present in the input radiation therethrough to provide the output radiation, and mutually mismatched for hindering higher-order mode radiation components present in the input radiation from propagating therethrough and contributing to the output radiation, the method of fabrication including the steps of:
(a) providing a substrate onto which the filter is to be formed;
(b) defining and forming the rib-waveguide sections; and
(c) defining and forming structures to impart to the sections their radiation mode filtering characteristics, the rib-waveguide sections being used in the method to define boundaries of the structures and thereby render the method a self-aligning process.

BRIEF DESCRIPTION OF THE DRAWINGS

Embodiments of the invention will now be described, by way of example only, with reference to the following diagrams in which:

FIG. 1 is a schematic illustration of part of a prior art rib waveguide fabricated onto a major surface of a, substrate of an integrated optical circuit;

FIG. 2 is a cross-sectional view of the prior art waveguide shown in FIG. 1, the cross-sectional view illustrating energy contours associated with fundamental mode radiation propagation along the waveguide;

DESCRIPTION OF ILLUSTRATED EMBODIMENT

Figure 3:
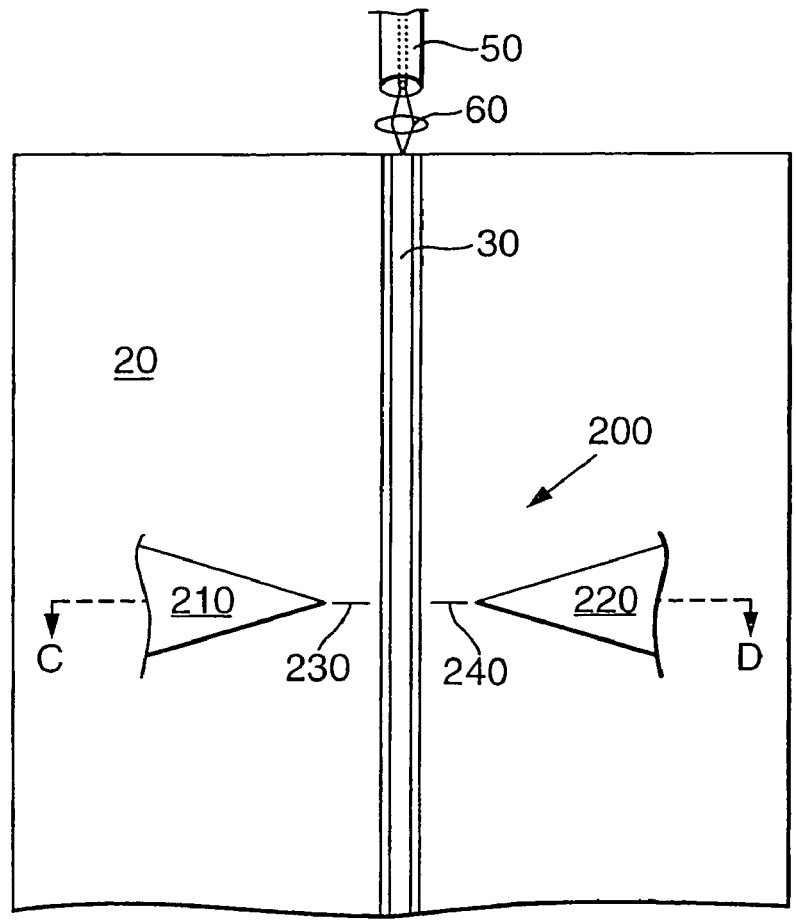
FIG. 3 is an illustration of a pin-hole type guided wave spatial filter according to a first embodiment of the invention.
Figure 3:
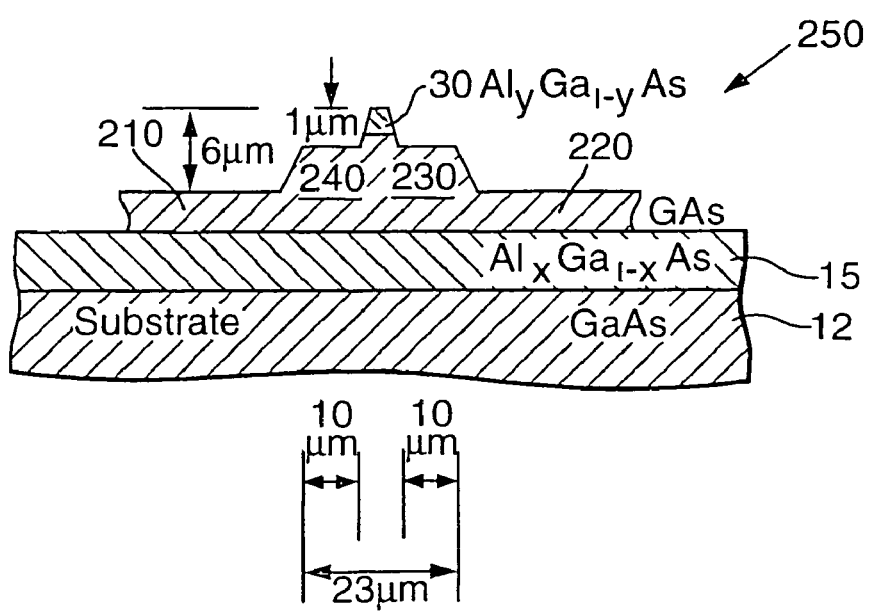

Referring now to FIG. 1, there is shown a prior art integrated optical circuit indicated generally by 10. The circuit 10 comprises in sequence a GaAs substrate 12, a lower substrate layer 15 having a chemical composition $Al_xGa_{(1-x)}As$ where a subscript x is in a range of 0.1 to 0.3, an upper substrate layer 20 having a chemical composition GaAs, and a surface rib waveguide 30 having a chemical composition $Al_yGa_{(1-y)}As$ where a subscript y is in a range of 0.1 to 0.3. With regard to chemical composition, symbols Al, Ga and As are used to represent aluminium, gallium and arsenic respectively. The rib waveguide 30 has a lateral width in the order of 3 to 5 µm and a projecting height in the order of 1 µm above an exposed planar exposed surface 35 of the layer 20. Side walls of the waveguide are shown tapered inwardly in a direction towards an upper surface of the waveguide 30 remotest from the layers 15, 20. The rib waveguide 30 is designed to guide optical radiation having a free-space wavelength of substantially 1.5 µm. The layer 20 is designed to exhibit a relatively higher refractive index than that of the lower substrate layer 15 and the rib waveguide 30 for radiation confinement purposes to the waveguide and a region closely associated therewith.

The waveguide 30 is substantially straight in a first section $L_1$ but is curved at a bend point 40 into a second straight section $L_2$. A monomode optical fibre waveguide 50 is also shown, the fibre waveguide 50 for injecting optical radiation through a focussing lens 60 into the rib waveguide 30.

Only part of the circuit 10 is shown in FIG. 1; the waveguide 30 continues to other sections of the circuit 10, for example modulators and couplers.

In operation, the waveguide 30 is designed to guide substantially fundamental mode optical radiation thereal-ong; the waveguide 30 is however capable of also guiding higher-order bound radiation modes. Input optical radiation having a free-space wavelength of substantially 1.5 µm is guided along the fibre waveguide 50 and exits at an open end thereof to the lens 60 which focuses the radiation substantially onto an open end of the rib waveguide 30. The radiation then propagates along the first section $L_1$ of the rib waveguide 30 towards the bend point 40 and therepast along the second section $L_2$ further into the integrated circuit 10.

In coupling radiation into the integrated circuit 10, there are a number of ways in which radiation other than fundamental mode radiation can be excited which is capable of propagating along the rib waveguide 30 into the circuit 10. As a first example, inefficient launch of the radiation from the fibre waveguide 50 into the rib waveguide 30 can result in higher-order bound mode radiation being excited in the rib waveguide 30. As a second example, misalignment of the lens 60 can also result in higher-order bound mode radiation being excited, especially odd-order radiation modes. As a third example, the bend point 40 can give rise to radiation scattering and hence excitation of higher-order radiation modes in planar waveguide regions lying on both sides of the waveguide 30; radiation scattering at the bend point 40 becomes more severe as the radius of curvature of the rib waveguide 30 there becomes smaller. As a fourth example, a geometrical disturbance such as a kink or an indent 70 in the rib waveguide 30 can also result in coupling of fundamental mode radiation to higher-order mode radiation and also will scatter radiation to surface planar modes.

Moreover, dumped light from an on-chip filter (not shown in FIG. 1) or an unwanted complementary output from an interference modulator (also not shown in FIG. 1) can additionally, for example, give rise to non-fundamental mode radiation propagation within the circuit 10; such non-fundamental mode radiation can, for example, couple into the rib waveguide 30.

From the foregoing, it will be appreciated in optical integrated circuits that, although fundamental mode radiation propagation within the circuits is desired, it is relatively easy to excite higher-order radiation modes. Such higher-order mode radiation can be deleterious to circuit performance. The inventor has appreciated that it is desirable to include structures in optical integrated circuits which filter out bound higher-order mode radiation excited therein, the structures being one or more guided wave spatial filters according to the invention.

In order to further describe the nature of radiation propagation along the rib waveguide 30, reference is made to FIG. 2 which is a cross-sectional view of the rib waveguide 30 in FIG. 1. The cross-sectional view illustrates energy contours associated with fundamental mode radiation propagation along the waveguide 30. Along an axis A-B, the energy contours follow an approximately Gaussian profile where most of the fundamental mode energy is concentrated towards a central region 100 substantially equi-distant between the waveguide 30 and an interface of the layers 15, 20 in the vicinity of the waveguide 30. This approximately Gaussian profile 80 is illustrated in a graph indicated generally by 90 in FIG. 2. Only a small proportion of the fundamental mode radiation impinges into lateral regions 105, 110 away from the rib waveguide 30. The lateral regions 105, 110 effectively form a slab-waveguide in which in-plane mode radiation is capable of propagating. Higher-order mode bound radiation is held within the slab-waveguide and disperses spatially only relatively gradually along the rib waveguide 30. As the order m of the radiation mode increases, progressively a greater proportion of the radiation energy of the mode is present in the lateral regions 105, 110 compared to the central region 100 as illustrated by a profile 95 in the graph 90.

The waveguide 30 in FIGS. 1 and 2 can be fabricated epitaxially using a fabrication process comprising the following steps:

(a) providing a polished bulk GaAs substrate 12;
(b) epitaxially growing the lower substrate layer 15 onto the substrate 12;
(c) epitaxially growing the upper substrate layer 20 onto the lower substrate layer 15;
(d) epitaxially growing a top layer of $Al_yGa_{1-y}As$ onto the upper substrate layer 20;
(e) depositing an etch resist layer onto the top layer and then lithographically delineating the resist layer using a mask to define the rib waveguide 30;
(f) reactively ion etching or isotropically wet etching the top layer through the delineated etch resist layer so that the top layer is etched away except in a region of the waveguide 30; the etching may be allowed to proceed a relatively short distance, for example in the order of 0.5 µm, into the upper substrate layer 20 as illustrated in FIG. 1; the waveguide 30 can project, for example, by a height of substantially 1 µm; and
(g) stripping away the etch resist layer.

The etching in step (f) can give the waveguide 30 its tapered side wall form but will depend upon etching conditions and type of etch employed. The anisotropic wet chemical etching produces tapered walls to the waveguide 30 automatically provided that the upper substrate layer 20 is grown to provide a <001> orientated exposed plane surface so that the tapered side walls of the waveguide 30 corresponds to <110> crystal planes.

If the etching process during fabrication of the waveguide 30 is prolonged so that the regions 105, 110 are thinner, lateral confinement of radiation by the waveguide 30 is enhanced especially at bends, for example at the bend point 40. Deeper etching into the upper substrate layer 20 beyond a certain limit establishes a possibility of bound higher-order lateral modes propagating in a direction along the waveguide 30. Such higher-order lateral modes are usually undesirable and therefore the depth of etching is limited and represents a compromise.

In the prior art, there are several known guided-wave structures capable of providing mode-dependent filtration properties; such properties arise from the structures behaving as scattering disturbances whose effectiveness increases with the order m of the radiation mode propagating through the structures. The structures often assume a shape similar to a waveguide kink or arc-bend. When the structures assume the form of S-bends, there is an extra beneficial effect of lateral optical path displacement for fundamental mode radiation out of the field of in-plane mode radiation which is expected to continue on its original straight-line trajectory rather than faithfully following S-bend trajectories since, by definition, such radiation is not bound to the rib waveguide.

A circular arc bend in a rib waveguides possesses an extremely sharp cut-off characteristic as a function of bend radius when considering higher-order radiation mode confinement around the bend. As the radius of the bend is reduced, and thereby lateral confinement weakened, radiation loss characteristics of the bend change relatively little until the radius reaches a threshold value beyond which the loss characteristics of the bend increase rapidly for higher-order radiation modes. Accordingly, an arc bend can be designed to exhibit a relatively low loss for fundamental mode radiation but a relatively high loss for more weakly bound higher-order radiation modes.

When designing radiation mode filters into optical integrated circuits, rib waveguides configured to include bends therein for providing a mode filtering function suffer a number of problems. A transition from a straight section of rib waveguide into a curved section of rib waveguide following on from the straight section represents an asymmetrical radiation trajectory disturbance; the curved section is an inherently radiation-leaky structure. Moreover, in practice when fabricating curved section rib waveguides, lithographic processes are employed which make use of lithographic masks. These masks include curved pattern features which are digitised in nature and comprise a sequence of lateral steps, the steps being barely perceptible. However, such steps result in the formation of scattering features and hence in a finite minimum scattering loss that can be obtained from curved rib waveguides fabricated from the masks.

It is found in practice that including a relatively small S-bend rib waveguide filter at an optical input port of an optical integrated circuit device does not afford adequate filtration of higher-order mode radiation components excited, for example, as a consequence of misalignment of an optical fibre waveguide relative to the optical port, the fibre operable to launch radiation into the optical port.

The inventor has therefore devised an alternative guided wave spatial filter which is more effective at rejecting higher-order mode radiation and is more compact than the aforementioned S-bend, circular arc bend and waveguide kink filters presently used. Moreover, the alternative spatial filter is of a symmetrical configuration.

The inventor has appreciated that surface guiding of radiation in the rib waveguide 30 can be impeded by etching the upper substrate layer 20 deeper in selected regions thereof. Such selective deeper etching is effective at forcing at least substantially 1-dimensional radiation modes propagating within the regions 105, 110 into cutoff. Thus, the upper substrate layer 20 is made selectively thinner in regions thereof so that the layer 20 is incapable of supporting propagation of radiation through the regions. Preferably, the substrate layer 20 is selectively etched through completely in the aforementioned regions.

The inventor has also appreciated that the waveguide 30 can be fabricated by etching through the upper substrate layer 20 entirely around the waveguide 30. However, it is found in practice that wet chemical etching processes used to etch deeply into the upper substrate layer 20 and the lower substrate layer 15 also etch laterally causing the waveguide 30 to become impracticably narrow; such narrowing of the waveguide 30 can to an extent be circumvented by using reactive ion etching (RIE) processes in substitution for wet etching processes. However, these RIE processes are more costly and exhibit a lower etching rate compared to the wet etching processes. Moreover, RIE processes are incompatible with self-alignment techniques used to fabricate guided wave spatial filters according to the invention; such self-alignment will be described later.

Referring now to FIG. 3, there is shown in plan view a pin-hole type guided wave spatial filter according to a first embodiment of the invention. The pin-hole filter is indicated generally by 200 and includes the substrate 12, the lower substrate layer 15, the upper substrate layer 20, the rib waveguide 30 and two deeper etch regions 210, 220 etched symmetrically about the waveguide 30 but not encroaching thereonto; regions of shallower etching 230, 240 separate the waveguide 30 from the deeper etch regions 210, 220. The deeper regions 210, 220 each assume the form of a triangular area having a corner thereof orientated to point towards the waveguide 30 as illustrated in FIG. 3, each corner is at a distance of 10 µm from its nearest peripheral wall of the waveguide 30. The comers are mutually separated by a distance of substantially 23 µm.

In FIG. 3, there is also shown a cross-sectional view of the filter 200 along an axis C–D, the view indicated generally by 250.

When fabricating the filter 200, the following processing steps can be employed:

(a) the lower substrate layer 15 is epitaxially grown onto the polished GaAs bulk substrate 12, the lower substrate layer 15 having a chemical composition $Al_xGa_{1-x}As$; a subscript x here has a value in the range of 0.1 to 0.2.

(b) the upper substrate layer 20 is epitaxially grown onto the lower substrate layer 15, the upper substrate layer 20 having a chemical composition GaAs;

(c) a top layer is epitaxially grown onto the upper surface layer 20, the top layer having a composition $Al_yGa_{1-y}As$ where a subscript y here is in a range of 0.1 to 0.3;

(d) a first etch resist layer is deposited onto the top layer;

(e) the first etch resist layer is delineated using a first lithographic mask to define the rib waveguide 30 of nominally 3 µm lateral width and leaving areas surrounding the waveguide 30 unmasked;

(f) a wet etching process or a dry reactive ion etching process is then applied to etch shallowly to a depth of approximately 1 µm in the surrounding areas but not at the waveguide 30 which is masked off from the etchant by the delineated first etch resist layer;

(g) the first layer is stripped off, and then a second etch resist layer is deposited onto the waveguide 30 and the shallowly etched areas surrounding the waveguide 30;

(h) a second lithographic mask is then optically aligned relative to the waveguide 30 and then the deeper etch regions 210, 220 delineated from the second mask into the second etch resist layer;

(i) an anisotropic wet chemical etch or reactive ion etch is then applied to etch the regions 210, 220 through delineated triangular windows formed in the second etch resist layer; and (j) the second etch resist layer is finally stripped off.

The deeper etch regions 210, 220 are etched to a greater depth into the upper surface layer 20 relative to the shallower etch regions surrounding the waveguide 30. If necessary, the deeper etch regions 210, 220 can be etched into the lower substrate layer 15, or even as far as the GaAs substrate 12 itself.

The pin-hole spatial filter 200 operates in a manner analogous to a bulk-optics pinhole; the waveguide 30 passes between the deeper etch regions 210, 220 at both sides of the waveguide 30. The regions 210, 220 are effective at reflecting higher-order mode radiation away from the path of the waveguide except for radiation closely associated with the waveguide, namely fundamental mode radiation and higher-mode radiation mode components having m values close to unity, for example having nm values in a range of 2 to 10.

The pin-hole filter 200 exhibits a number of limitations. In optical integrated circuits, it is these higher-order radiation modes having m values close to unity that are most deleterious to circuit performance; many of these radiation modes are capable of propagating through the filter 200 together with the fundamental mode radiation. Moreover, concatenations of such a pin-hole filter 200 perform little better than an isolated single pin-hole filter 200 unless the filters are well spaced in the concatenation. Radiation passing through such a concatenation becomes collimated and subsequently has a relatively low diffraction angle with respect to an elongate axis of the waveguide 30. Furthermore, the fabrication steps (a) to (j) to make the filter 200 require alignment of two masks; in other words, the steps (a) to (j) do not correspond to a self-alignment process. The inventor has appreciated that a self alignment fabrication process is highly desirable. Additionally, a possible minimum width of the regions 230, 240 is limited by etch undercut tolerances in the etching processes used to define the waveguide 30 and also the deeper etch regions 210, 220.

Figure 4:
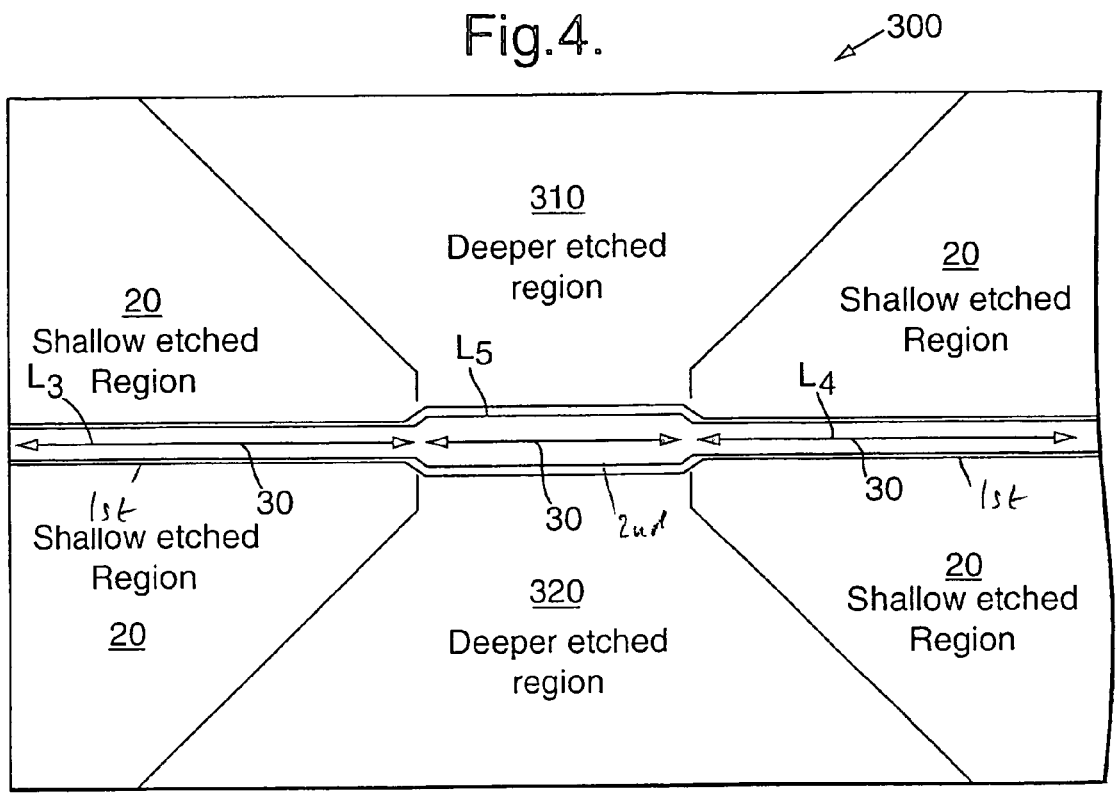
FIG. 4 is an illustration of an in-line type guided wave spatial filter according to a second embodiment of the invention.

The inventor has therefore devised an alternative design of spatial filter according to the invention which addresses the performance limitations of the filter 200 as well as technical difficulties associated with its fabrication. Referring to FIG. 4, there is shown in plan view an in-line type guided wave spatial filter according to a second embodiment of the invention, the in-line guided wave filter indicated generally by 300. The filter 300 comprises the waveguide 30 flanked along its length in sections $L_3$, $L_4$ thereof by the upper substrate layer 20 which has been shallowly etched back so that an upper surface of the waveguide remotest from the layer 20 projects 1 µm above the layer 20 in a similar manner as in the integrated circuit 10. The filter 300 additionally comprises a central section $L_5$ situated between the section $L_3$, $L_4$ where the waveguide 30 is flanked by deeper etch regions 310, 320 at both sides thereof These deeper regions 310, 320 both taper outwardly away from the waveguide 30; as shown in FIG. 4, the regions 310, 320 commence their outward taper a short distance away from the waveguide 30. Moreover, the regions 310, 320 extend up to the waveguide 30 at the section $L_5$ as shown in FIG. 4. The waveguide 30 is of wider width along the section $L_5$ relative to its width along the section $L_3$, $L_4$.

The deeper regions 310, 320 are etched sufficiently deeply into the upper substrate layer 20 to prevent higher-order radiation modes from propagating therein. The regions 310, 320 can, if required, be etched through into the lower substrate layer 15. In a limiting case, the regions 310, 320 can be etched through to the substrate 12.

The section $L_5$ is designed to provide an efficient waveguide match to the sections $L_3$, $L_4$ as far as fundamental mode radiation is concerned. However, its match for higher-order radiation modes having an index m value of unity or greater is relatively poor. As a consequence, such higher-order mode radiation is not efficiently transmitted through the filter 300 whereas fundamental mode radiation having an index value m=0 is efficiently transmitted.

Figure 5:
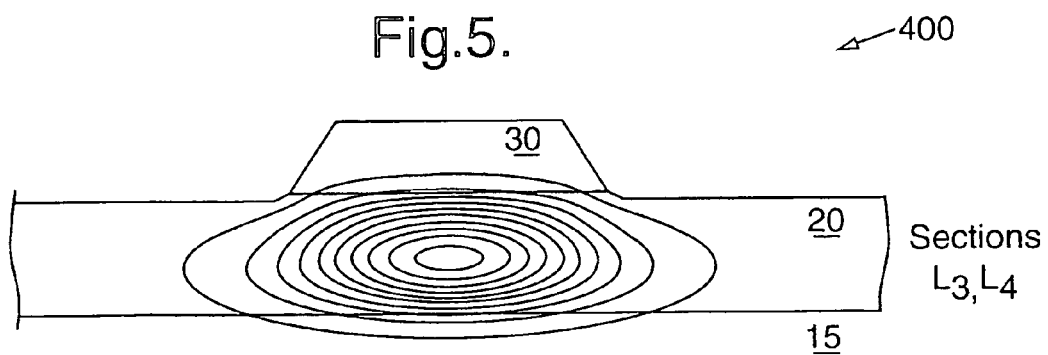
FIG. 5 is a view of an energy profile of fundamental mode radiation propagating through sections $L_3$, $L_4$ of the spatial filter in FIG. 4 compared to a corresponding energy profile for a section $L_5$ of the filter.
Figure 5:
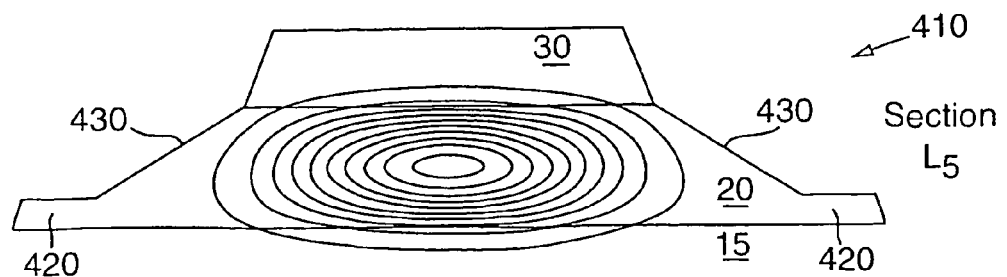

Referring now to FIG. 5, there is shown a view of an energy profile indicated by 400 of fundamental mode radiation propagating through the sections $L_3$, $L_4$ of the spatial filter 300. There is also shown indicated by 410 an energy profile of the fundamental mode radiation propagating through the section $L_5$. In the profile 400, the fundamental mode radiation impinges laterally beyond the waveguide 30 into the upper substrate layer 20. In contrast, in the profile 410, the radiation propagates more closely beneath the waveguide 30. Regions 420 are sufficiently thin so that higher-order mode radiation is unable to propagate along the waveguide 30 in the section $L_5$. Despite the profiles 400, 410 appearing to have different energy distributions, their calculated overlap integral is in the order of 98 to 99% corresponding to transmission loss of 0.06 dB for fundamental mode radiation transmitted through the filter 300. However, energy profiles for higher-order radiation modes through the sections $L_3$, $L_4$ relative to the section $L_5$ are much more dissimilar; the filter 300 is thus capable of providing mode filtration.

In the section $L_5$, etching processes used to produce the filter 300 result in the generation of sloping sidewalls 430. Such sloping sidewalls 430 arise when wet anisotropic etchants are employed which preferentially etch certain crystallographic planes more slowly than other planes; crystallographic planes exposed at the sloping sidewalls correspond to relatively slow etching planes. If reactive ion etching is used to form the deeper regions 310, 320, the sidewalls 430 can be made having a relatively steeper inclination. As aforementioned, if the sidewalls 420 are substantially mutually parallel, there is a tendency for the waveguide 30 to support propagation of undesirable lateral radiation modes.

Figure 6:
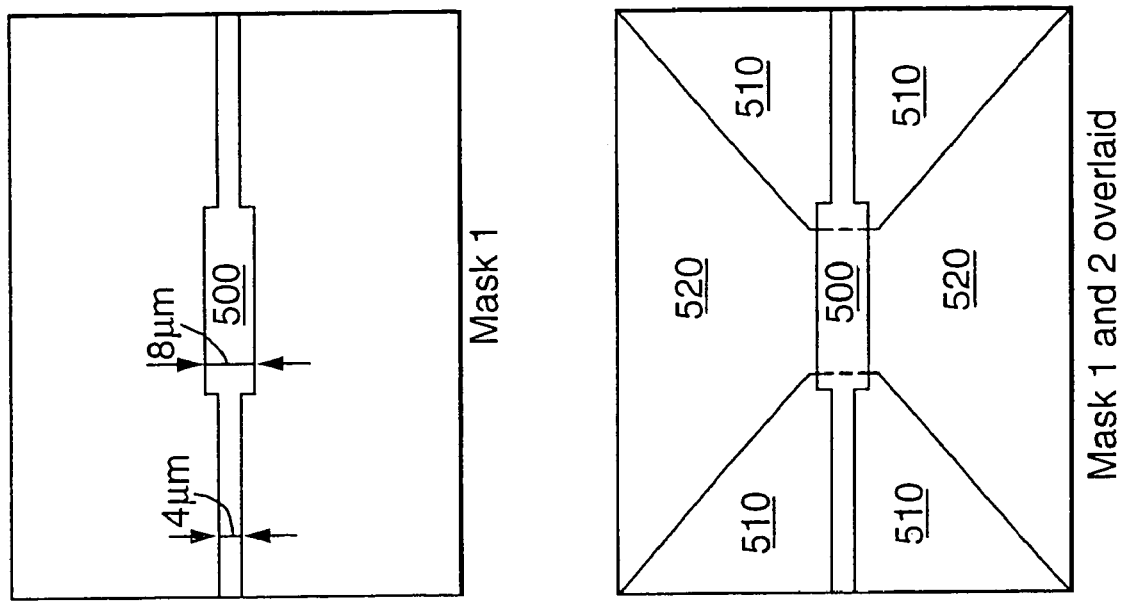
FIG. 6 is an illustration of mask patterns used for fabricating the filter in FIG. 4.
Figure 6:
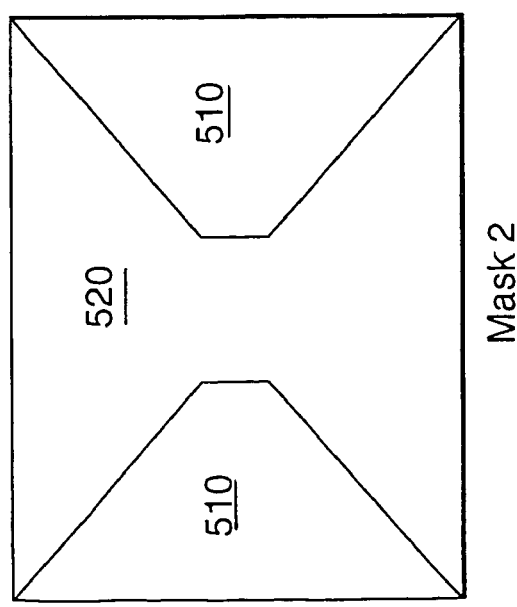

Fabrication of the filter 300 will now be described with reference to FIG. 6. The filter 300 is fabricated using a self-alignment process which involves photolithography using first and second masks, namely MASK 1 and MASK 2 respectively. The first mask is used for defining a region 500 which becomes the waveguide 30 after processing. The second mask is used for protecting shallow etch regions 510 and for exposing regions 520 for deep etching purposes. The regions 520 pass beneath the region 500, the first mask being used to define the edge of the waveguide 30 in the section $L_5$. The first mask is arranged so that the region 500 is 8 µm wide in the $L_5$ section, and 4 µm wide in the $L_3$, $L_4$ sections. Unlike the filter 200 which requires that its deeper etch regions 210 should be precisely aligned symmetrically about the waveguide 30, fabrication of the filter 300 does not need critical mutual mask alignment; for this reason, the filter 300 is fabricated using a process which is effectively self-aligning as will now be described.

Figure 7:
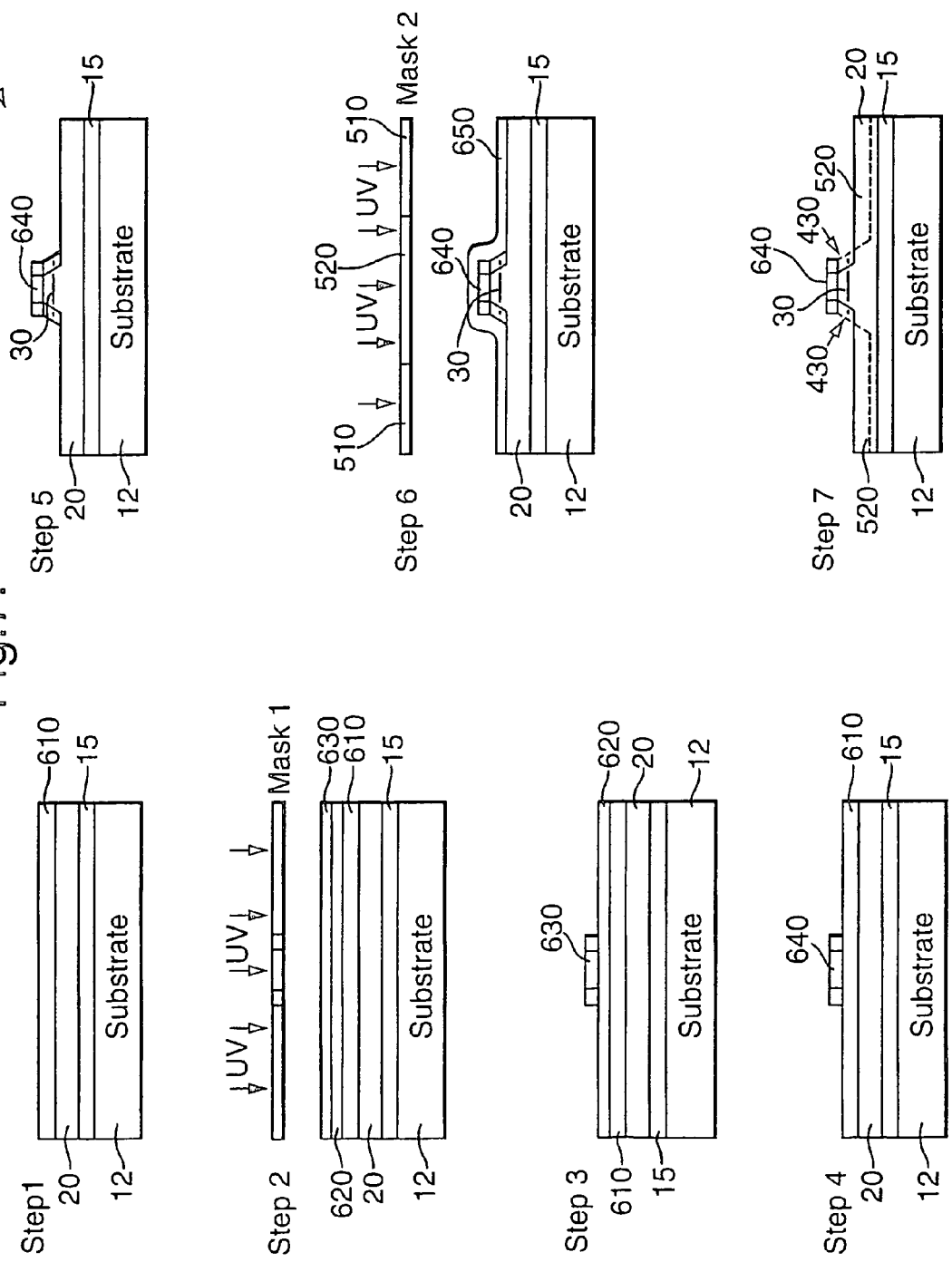
FIG. 7 is an illustration of processing steps required to fabricate the filter in FIG. 4.

Fabrication steps 1 to 7 of a self-aligning process indicated by 600 associated with fabricating the filter 300 are illustrated in FIG. 7. Although this process is described in the context of III–V semiconductors, it can be applied to other material systems, for example silicon.

Step 1:

The GaAs substrate 12, with in sequence its epitaxially grown lower substrate $Al_xGa_{1-x}As$ layer 15, its upper substrate GaAs layer 20, and a top layer $Al_yGa_{1-y}As$ layer 610 is initially provided. The top layer 20 is grown so that it exposes a <001> plane on its upper exposed surface remotest from the substrate 12.

Step 2:

A metallic layer of aluminium-titanium 620 is then vacuum deposited onto the top layer 610. A layer of organic resist 630 is then spun onto the layer 620. The region 500 in FIG. 6 corresponding to the waveguide 30 in FIG. 4 is then delineated in the resist layer 630 by UV exposure using MASK 1. The organic resist is then developed in an organic solvent to leave an island of resist 630 as illustrated in STEP 3. It is to be noted, as an alternative to using the metallic layer 620, dielectric layers such as silicon oxy-nitrides can be employed.

Step 3:

Sputtering or etching processes are then applied to remove the layer 620 where it is not protected by remaining regions of the resist layer 630 to leave a metallic region 640 remaining as shown in STEP 4. It is to be noted that a "lift-off" process can alternatively be used in steps 2 to 4 to define the metallic region 640, the "lift-off" process involving deposition of the resist layer 630 directly onto the top layer 620, exposure of the resist layer 630 through MASK 1 and subsequent resist development in a solvent to yield an undercut resist profile, followed by deposition of the metal layer 620 onto the resist 630 and delineated windows therein, followed by solvent development to remove the resist layer 630 leaving the metallic layer 620 remaining where it is directly deposited onto the top layer 610 through the aforementioned windows.

Step 5:

The substrate 12 and its associated layers from STEP 4 is then subjected to an anisotropic wet chemical etch which is sustained for a sufficient duration to etch to a depth of substantially 1 µm down from the top of the top layer 610. The wet chemical etch is formulated not to etch into the residual metallic layer 640. The wet etch thereby defines the rib waveguide 30 and its associated sloping sidewalls which correspond to exposed <110> cystallographic planes of the top layer 610.

Step 6:

A layer of organic resist 650 is then spun unto the substrate 12 and its associated layers from STEP 5 as shown. The resist layer 650 is then exposed to UV radiation through MASK 2 to delineate the region 520 in FIG. 6 corresponding to the deeper etch regions 310, 320 in FIG. 4; it is to be noted that the region 520 projected from MASK 2 onto the resist layer 650 passes over the residual metallic layer 640 in STEPS 5, 6 where the layer 650 acts as an effective mask against chemical etching, thereby partitioning the region 520 to create the two regions 310, 320; this is an important aspect because it provides the process with its "self-aligning" characteristic.

Step 7:

The resist layer 650 is next developed to leave the regions 520 devoid of resist protection. The anisotropic wet chemical is then reapplied so that the region 520 corresponding to the regions 310, 320 are etched to a depth of substantially 2 µm, namely so as to thin the upper surface layer 20 sufficiently so that it is incapable of sustaining higher-order mode radiation propagation therein. The wet etch generates the sloping sidewalls 430 as depicted in STEP 7 and illustrated in FIG. 5. Remaining regions of the resist layer 650 after UV exposure through MASK 2 are used to protect the upper layer 20 in its shallower etch regions corresponding to the regions 510 in FIG. 6 during the anisotropic wet etch.

It will be appreciated in the process that reactive ion etching can be used as an alternative to wet chemical etching. However, although reactive ion etching is generally anisotropic, such etching is less influenced by exposed crystallographic planes and hence can result in steeper sidewalls 430.

Figure 8:
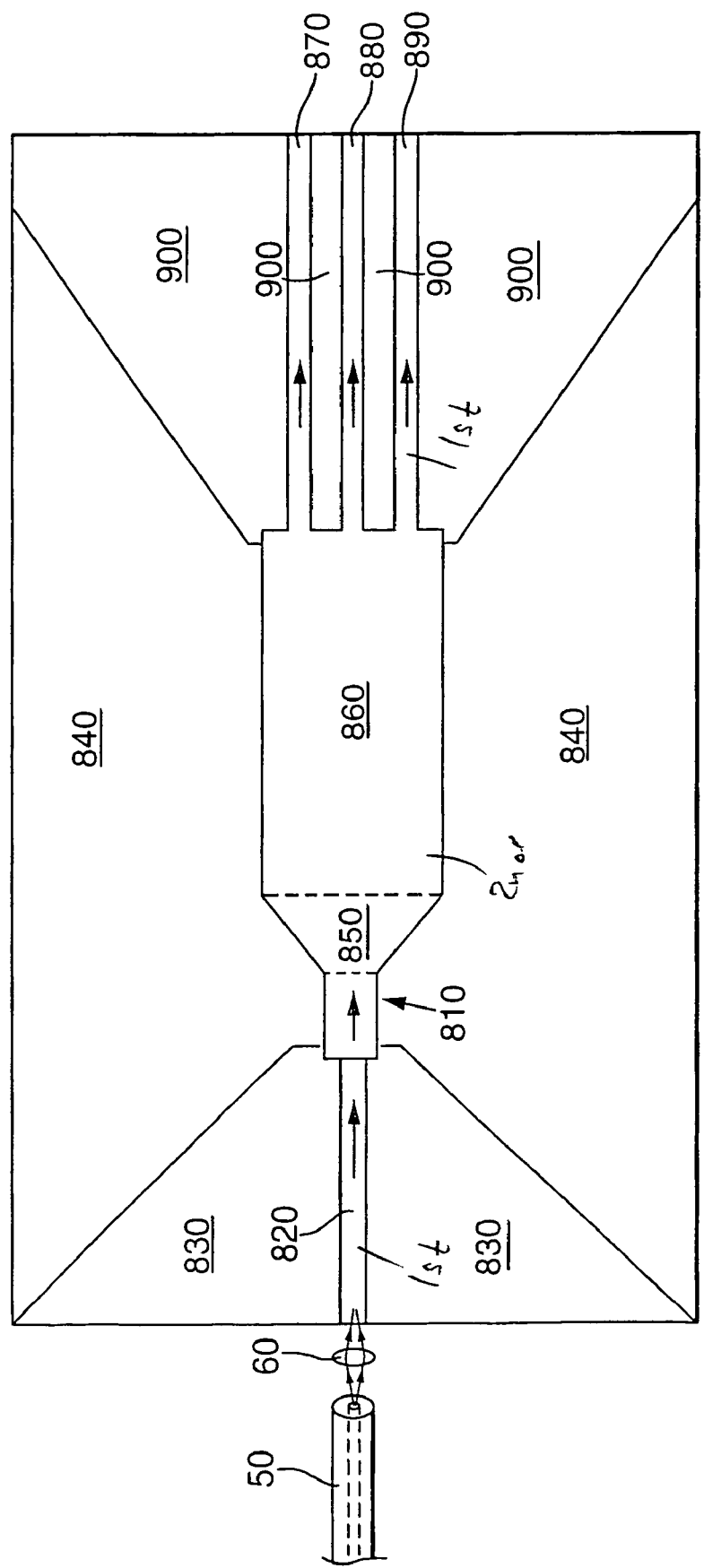
FIG. 8 is an illustration of a multimode interference splitter comprising a guided wave spatial filter according to a third embodiment of the invention, the filter incorporated at an optical input port of the splitter.

Variants of the spatial filter 300 in FIG. 5 can be fabricated in conjunction with other types of optical structures, for example FIG. 8 is an illustration of a multimode interference splitter indicated generally by 800, the splitter 800 comprising a guided wave spatial filter indicated by 810 according to a third embodiment of the invention incorporated at an optical input port of the splitter 800.

In comparison to the splitter 800, a conventional multimode splitter comprises an optical input port coupled to a multimode mixing region including a plurality of optical output ports. The input and output ports are coupled to waveguides for guiding optical radiation to and from the mixing region. Fundamental mode input radiation is applied through a waveguide associated with the input port to the mixing region and excites a multiplicity of radiation modes in the region. The output ports are judicially positioned where the multiplicity of modes mutually sum to provide energy maxima. As a consequence, such a conventional multimode splitter can be made to couple radiation highly efficiently.

However, a problem arises where the radiation applied through the input port to the conventional splitter is not pure fundamental mode radiation but comprises an add mixture of fundamental and higher-order mode radiation. Such higher-order mode radiation will modify the balance of the multiple modes within the mixing region and result in a reduction of efficiency of the splitter by shifting positions and phase where energy maxima occur. The inventor has therefore appreciated that it is desirable to include the filter 810 at the input port of the splitter 820.

Referring to FIG. 8, the splitter 800 comprises an input rib waveguide 820 of similar construction to the aforementioned rib waveguide 30. The waveguide 820 is flanked on both sides thereof by shallow etched regions 830 of 1 µm depth relative to an upper surface of the waveguide 820. The regions 830 are etched in an upper substrate layer corresponding to the upper substrate layer 20. The waveguide 820 is connected to an input port of the filter 810, the filter 810 being flanked on both sides thereof by deeper etched regions 840 which are sufficiently thin to render them incapable of supporting the propagation of higher-mode radiation therein. The filter 810 is preferably in a range of 150 to 200 µm long although other lengths can be employed. The filter 810 is connected at its output port through a tapered region 850 to a multimode mixing region 860 of the splitter 800, the mixing region 860 also being flanked by the same deeper etched regions 840. Connected to an end of the region 860 remote from the filter 810 are optical output ports connected to associated rib waveguides 870, 880, 890. The waveguides 870, 880, 890 are flanked by shallow etched regions 900. Moreover, the waveguides 870, 880, 890 are of similar construction to the aforesaid rib waveguide 30. The shallow etched region is tapered backwardly away from the waveguide 820 although this is not essential for operation. The filter 810 is operable to provide an efficient matching for fundamental mode radiation propagating from the waveguide 820 into the mixing region 860 but an inefficient transmission of higher-order radiation modes. Backward tapering of the deeper-etched regions 840 assists to deflect higher-order mode radiation away from the filter 810 and the mixing region 860.

Operation of the filter 810 in the splitter 800 will now be described with reference to FIG. 8. A mixture of fundamental mode radiation and bound higher-order mode radiation propagates along the waveguide 820, the higher-order mode radiation being excited, for example, by a bend earlier in the waveguide 820 or a misaligned optical fibre waveguide launching radiation into the waveguide 820. The mixture of radiation propagates along the waveguide 820 to the filter 810 which transmits the fundamental mode radiation into the mixing region 860 and substantially blocks and reflects the higher-order mode radiation. The fundamental mode radiation injected into the mixing region excites a multiplicity of radiation modes therein in an intended manner substantially uninfluenced by higher-order mode radiation propagating in the waveguide 820. The multiplicity of modes in the mixing region 860 propagate to the output ports of the mixing region 860 and therefrom along the waveguides 870, 880, 890 to other optical structures (not shown) connected to-the splitter 800.

The tapered region 850 is tapered to deflect any residual higher-order mode radiation sideways. The tapered region 850 is an optional feature and can be omitted without preventing the mixing region 860 from performing its mixing function.

In a modified version of the splitter 800, one or more filters similar to the filter 810 are included at the output ports between the mixing region 860 and the waveguides 870, 880, 890 for ensuring that substantially fundamental mode radiation is output into the waveguides 870, 880, 890.

Filters according to the invention can be incorporated into other types of optical structure. For example, referring to FIG. 9, there is shown an interferometric modulator indicated generally by 1000 including a guided wave spatial filter 1010 according to a fourth embodiment of the invention, the filter 1010 incorporated at an optical output port of the modulator 1000. The modulator 1000 comprises an input rib waveguide 1020 flanked by shallow etch regions 1030 on both sides thereof, first and second elongate mixing regions indicated by 1040a, 1040b respectively and including a modulation structure 1050 and surrounded by deep etch regions 1060, a first output rib waveguide 1070 flanked by the deep etch regions 1060, the filter 1010 flanked by deep etch regions 1060 and a second output rib waveguide 1080 flanked by shallow etch regions 1090. In a similar manner to the splitter 800, the regions 1060 are etched sufficiently deeply so that higher-order mode radiation is not capable of propagating therein. The shallow etch regions 1030, 1090 are etched sufficiently deeply for the waveguides 1020, 1080 to be capable of guiding fundamental mode radiation. The waveguide 1020 is connected to the first mixing region 1040a. Likewise, the waveguides 1070, 1080 are connected to the second mixing region 1040b, the waveguide 1080 connected via the filter 1010.

The input waveguide 1020, the filter 1010 and the mixing regions 1040a, 1040b are substantially co-linearly disposed. The first output waveguide 1070 is connected off-axis to the second mixing region 1040b, the first waveguide 1070 including a reflective facet 1100 on a side of the waveguide 1070 facing towards the second waveguide 1080 and the filter 1010.

The modulator 1000 is fabricated using III–V compound technology so that electric-field induced. Pockels effect changes in refractive index in the structure 1050 can be exploited for selectively diverting radiation between the output waveguides 1070, 1080. Metallic electrode tracks represented by 1110 are connected to the structure 1050 for conveying electrical modulation signals thereto. The facet 1100 is a feature which assists with efficient diversion of radiation into the first output waveguide 1070 so that first output waveguide can be orientated with its elongate axis at an angle, for example 40°, to a principal axis of the second mixing region 1040b. The facet 1100 thereby enables the modulator 1000 to be more compact; omission of the facet 1100 would necessitate the first waveguide 1070 being connected at a shallower angle to the mixing region 1040b and including a bend further along the waveguide 1070. The facet 1100 also enables the filter 1010 to be flanked by broader deep-etched regions. Moreover, the facet 1100 is also effective at deflecting higher-order mode radiation away from the first output waveguide 1070 path.

Figure 9:
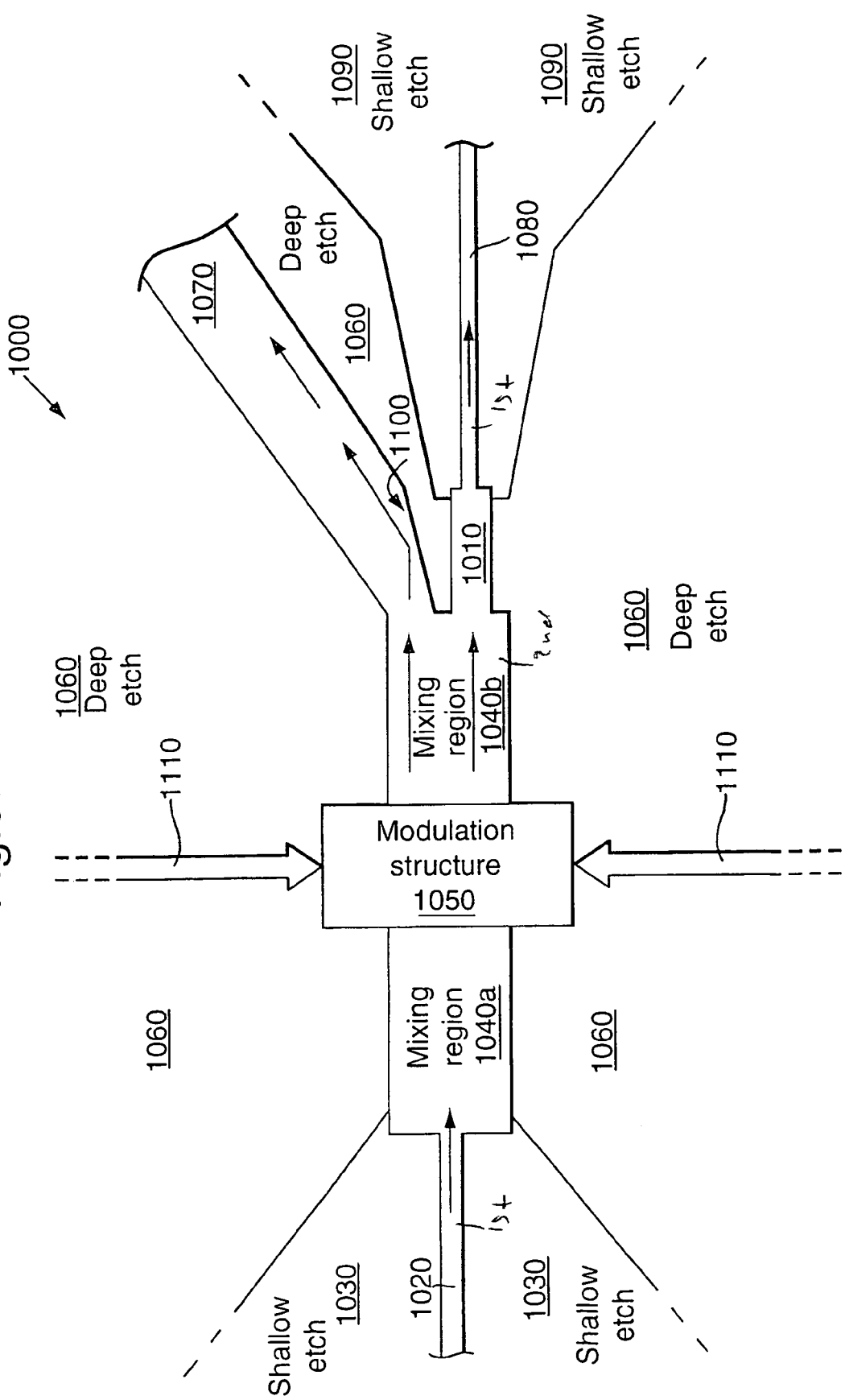
FIG. 9 is an illustration of an interferometric modulator including a guided wave spatial filter according to a fourth embodiment of the invention, the filter incorporated at an optical output port of the modulator only.

Operation of the modulator 1000 will now be described with reference to FIG. 9. The modulation structure 1050 is initially unbiased to give an unmodified refractive index therein. Fundamental mode optical radiation propagates along the input waveguide 1020 to the first mixing region 1040a into which it is injected. The injected radiation undergoes intermode coupling and thereby stimulates the generation of a series of higher-order radiation modes within the first region 1040a, the first region 1040a being capable of supporting such a series of modes. The mixing regions 1040a, 1040b are designed, when the structure 1050 is unbiased, so that the modes constructively interfere to provide a radiation node at an entrance aperture of the first output waveguide 1070 and a radiation anti-node at an entrance aperture of the filter 1010. As a consequence, radiation input at the input waveguide 1020 is coupled to the second output waveguide 1080 via its filter 1010 and not to the first output waveguide 1070. When the structure 1050 is electrically biased to generate an electric field therein and thereby modify its refractive index principally due to the Pockels effect, there is formed a node at the entrance aperture of the filter 1010 and an anti-node at the entrance aperture of the first output waveguide 1070. Such node and anti-node formation results in radiation input through the input waveguide 1020 being substantially coupled to the first output waveguide 1070 and not to the filter 1010 and its associated second output waveguide 1080.

In the modulator 1000, exciting the series of modes in the mixing regions 1040a, 1040b is a fundamental aspect of operation. The filter 1010 is effective at ensuring that substantially only fundamental mode radiation passes from the second mixing region 1040b into the second output waveguide 1080. As a consequence, extinction ratio performance of the modulator 100 is improved as a result of including the filter 1010.

If required, a filter according to the invention such as the filter 810 can be incorporated as an input filter in-line with the input waveguide 1020 at the entrance aperture to the first mixing region 1040a. The input filter is effective at preventing higher-order mode radiation propagating along the waveguide 1020 and subsequently interfering with intended multimode excitation within the first and second mixing regions 1040a, 1040b. As a result, inclusion of the filter 1010 and the input filter can improve the extinction performance of the modulator 1000.

The filter 1010 is fabricated using a self-aligned process as employed for fabricating filter 300 shown in FIG. 4.

It will be appreciated by one skilled in the art of spatial filter design that modifications can be made to the filters 200, 300, 810, 1010 without departing from the scope of the invention. Filters according to the invention can be fabricated in other types of waveguide technology, for example in indium phosphide (InP) rib waveguide technology or in silica or silica-on-silicon rib waveguide technology. Moreover, filters according to the invention can even be implemented in hollow waveguide technology, for example in hollow waveguides machined in alumina substrates for guiding radiation having a wavelength in the order of 10 µm, and also in spliced optical fibre waveguide technology. Irrespective of the waveguide technology used, the invention requires two or more mutually adjoining waveguide sections which are substantially matched for fundamental radiation mode propagation therethrough and unmatched with regard to higher-order mode radiation propagation therethrough.

The invention claimed is:

1. A guided wave spatial filter for receiving optical input radiation and outputting corresponding filtered output radiation, the filter comprising first and second waveguide sections connected in series, the first and second waveguide sections being:
   (a) mutually matched relative to fundamental mode radiation for transmitting fundamental mode radiation components present in the input radiation therethrough to provide the output radiation; and
   (b) mutually mismatched for higher-order radiation modes for hindering higher-order mode radiation components present in the input radiation from propagating therethrough and contributing to the output radiation;
   wherein the first and second waveguide sections comprise rib waveguides, and the first waveguide section is flanked by first regions and the second waveguide section is flanked by second regions, the first regions being more shallowly etched relative to the second regions, and the second regions being etched to a sufficient depth so that said higher-order mode radiation components are substantially unable to propagate in the second regions.

2. A spatial filter according to claim 1 wherein the first regions are for supporting fundamental mode propagation along the first section and the second regions are for stripping in-plane radiation modes.

3. A spatial filter according to claim 1 wherein the second regions extend to about the second section.

4. A spatial filter according to claim 3 wherein the rib waveguide of the second waveguide section includes outwardly inclined walls, the walls being mutually inclined to hinder lateral mode radiation propagation along the second section.

5. A spatial filter according to claim 1 wherein the second regions have boundary edges which are disposed at non-orthogonal angles relative to an elongate axis of the second waveguide section, the edges operable to deflect bound higher-order mode radiation received thereat away from a radiation propagation path along the second section.

6. A spatial filter according to claim 1 wherein the rib waveguide of the second waveguide section is laterally broader than the rib waveguide of the first section.

7. A spatial filter according to claim 1 fabricated using III–V compound materials.

8. A spatial filter according to claim 1 wherein the second waveguide section is provided with two first sections configured to precede and follow the second section, the sections being connected in series.

9. A radiation splitter, comprising a radiation mixing region for supporting multimode radiation propagation therein, an input waveguide for injecting radiation into the mixing region, a plurality of output waveguides for receiving radiation output from the mixing region, and a first spatial filter according to claim 1 included between the input waveguide and the mixing region for transmitting fundamental mode radiation from the input waveguide into the mixing region and for hindering higher-order mode radiation from being injected from the input waveguide into the mixing region.

10. A splitter according to claim 9 wherein at least one of the output waveguides is connected to the mixing region through a second filter, the second filter being operable to hinder coupling of higher-order mode radiation from the mixing region into said at least one of the output waveguides.

11. An optical modulator incorporating modulating means for selectively diverting radiation input to the modulating means between a plurality of output paths in response to a control signal applied to the modulating means, at least one of the output paths including a filter according to claim 1 for transmitting fundamental mode radiation output from the modulating means to said at least one of the output paths and for hindering propagation of higher-order mode radiation from the modulating means to said at least one of the output paths.

12. A modulator according to claim 11 wherein the modulating means and the output paths are implemented in rib-waveguide form, the modulating means and the filter being flanked by regions which are sufficiently deeply etched to render them substantially unsusceptible to supporting the propagation of higher-order mode radiation therethrough.

13. A modulator according to claim 12 wherein at least one of the output paths includes a faceted rib waveguide boundary where the path adjoins onto the modulating means, and wherein inclusion of the boundary enabling the path to project directly away from the modulating means at a greater angle than possible without the faceted boundary.

14. A modulator according to claim 11 comprising an input path for injecting radiation into the modulating means, the input path being connected through the filter, the filter being operable to transmit fundamental mode radiation from the input path to the modulating means and to hinder the higher-order mode radiation being injected from the input path to the modulating means.

15. A modulator according to claim 11 wherein the modulating means comprises a structure susceptible to electric field induced changes of refractive index for selectively diverting the radiation input to the modulating means to the output paths.

16. A method of fabricating a guided wave spatial filter for receiving input radiation and outputting corresponding filtered output radiation, the filter comprising first and second rib-waveguide sections connected in series, the sections mutually matched for transmitting fundamental mode radiation components present in the input radiation therethrough to provide, the output radiation, and mutually mismatched for hindering higher-order mode radiation components present in the input radiation from propagating therethrough and contributing to the output radiation, the method of fabrication including the steps of:

(a) providing a substrate onto which the filter is to be formed;

(b) defining and forming the rib-waveguide sections; and then (c) defining and forming structures to impart to the sections their radiation mode filtering characteristics, the rib waveguide sections being used in the method to define boundaries of the structures and thereby render the method a self-aligning process.

* * * * *